(12) United States Patent
Fruehbauer et al.

(10) Patent No.: US 8,949,173 B2
(45) Date of Patent: Feb. 3, 2015

(54) PAY ZONE PREDICTION

(75) Inventors: Herwig Fruehbauer, Perchtoldsdorf (AT); Georg Zangl, Laxenburg (AT); Michael Stundner, Baden (AT)

(73) Assignee: Schlumberger Technology Corporation, Sugar Land, TX (US)

( * ) Notice: Subject to any disclaimer, the term of this patent is extended or adjusted under 35 U.S.C. 154(b) by 1294 days.

(21) Appl. No.: 12/607,747

(22) Filed: Oct. 28, 2009

(65) Prior Publication Data
US 2011/0099132 A1 Apr. 28, 2011

(51) Int. Cl.
*G06G 7/48* (2006.01)
*G01V 11/00* (2006.01)

(52) U.S. Cl.
CPC .................................. *G01V 11/00* (2013.01)
USPC ............................................. 706/62; 703/10

(58) Field of Classification Search
USPC .............................................. 703/10; 706/62
See application file for complete search history.

(56) References Cited

U.S. PATENT DOCUMENTS

| | | | |
|---|---|---|---|
| 6,052,520 A | 4/2000 | Watts, III | |
| 6,549,879 B1* | 4/2003 | Cullick et al. | 703/10 |
| 7,925,481 B2* | 4/2011 | Van Wagoner et al. | 703/10 |
| 2004/0133531 A1 | 7/2004 | Chen et al. | |
| 2006/0085174 A1 | 4/2006 | Hemanthkumar et al. | |
| 2006/0235668 A1* | 10/2006 | Swanson et al. | 703/10 |
| 2007/0061117 A1* | 3/2007 | Landis et al. | 703/10 |
| 2007/0112547 A1* | 5/2007 | Ghorayeb et al. | 703/10 |
| 2010/0010796 A1* | 1/2010 | Hovadik et al. | 703/10 |

OTHER PUBLICATIONS

C. Klose, "Self-organizing maps for geoscientific data analysis: geological interpretation of multidimensional geophysical data", Computational Geosciences, vol. 10, No. 3, pp. 265-277, 2006.*
D. Tearpock and R. Bischke, Applied Subsurface Geological Mapping with Structural Methods, 2d. ed., 2002, pp. 16-17, 332-334, 621-622, 724-732, and 775-780.*
Office Action issued in Canadian Application No. 2,717,596 on Aug. 2, 2012, 2 pages.
Office Action issued in Canadian Application No. 2,717,596 on Jul. 30, 2013, 2 pages.
Office Action issued in Canadian Application No. 2,717,596 on Jun. 4, 2014, 6 pages.
Combined Search and Examination Report issued in United Kingdom Application No. 1018217.8 on Feb. 15, 2011, 8 pages.
Examination Report issued in United Kingdom Application No. 1018217.8 on Feb. 6, 2012, 3 pages.
Examination Report issued in United Kingdom Application No. 1018217.8 on Jun. 14, 2012, 2 pages.

(Continued)

*Primary Examiner* — Kakali Chaki
*Assistant Examiner* — Vincent Gonzales
(74) *Attorney, Agent, or Firm* — Alec J. McGinn

(57) ABSTRACT

Implementations of pay zone prediction are described. More particularly, apparatus and techniques described herein allow a user to predict pay zones in wells. By accurately predicting pay zones, the user can perforate an existing well at predefined well depths to access hydrocarbon bearing strata while avoiding other undesirable strata (such as water bearing strata). For example, in one possible implementation, well data and syntactic data from a first set of one or more existing wells can be used to create one or more syntactic models. These syntactic models can then be used with water cut and well data from the one or more existing wells to create a pay zone prediction model which can be used with wells outside of the first set of existing wells.

20 Claims, 9 Drawing Sheets

(56) References Cited

OTHER PUBLICATIONS

Examination Report issued in United Kingdom Application No. 1018217.8 on Jul. 25, 2013, 2 pages.

Ward, Joe, "Hierarchical Grouping to optimize an objective function", Journal of American Statistical Association, vol. 58(301), 1963, pp. 236-244.

* cited by examiner

PAY ZONE PREDICTION

BACKGROUND

Under existing practice, once a well has been drilled in a hydrocarbon field and various well logs have been run, a petro physicist is employed for several days to examine the well logs and identify pay zones in the well. Pay zones often include ranges of depths in the well from which hydrocarbons, and not merely water, can be reclaimed.

The time required by the petro physicist to review the logs can be very expensive. In addition to the costs of the petro physicist himself, the organization hoping to exploit the well must also absorb rig down time and lost production from the well while waiting for the petro physicist's recommendations. These losses can be compounded when a plurality of existing wells are being reviewed.

SUMMARY

Implementations of pay zone prediction are described. In one possible embodiment, well data and syntactic data from a first set of one or more existing wells is used to create one or more syntactic models. Well test result data from the one or more existing wells can be accessed and used in conjunction with the one or more syntactic models, and at least some of the well data, to create a pay zone prediction model.

In one implementation, well data can be accessed from a second well outside of the first set of one or more existing wells and be used along with the one or more syntactic models to estimate syntactic properties of the second well. The well data and syntactic properties of the second well can then be used along with the pay zone predictor model, to estimate properties, including pay zones, associated with the second well.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to apparatus and techniques for implementing pay zone prediction. More particularly, the apparatus and techniques described herein involve allowing a user to predict pay zones in wells. By accurately predicting pay zones, the user can perforate an existing well at predetermined well depths allowing for the access of hydrocarbon bearing strata while avoiding other undesirable strata (such as water bearing strata).

For example, in one possible implementation, well data and syntactic data from a first set of one or more existing wells can be used to create one or more syntactic models. These syntactic models can then be used with well test result data (such as water cut data) and well data from the one or more existing wells to create a pay zone prediction model.

In one implementation, the pay zone predictor model can be used to predict pay zones in a second well outside of the first set of wells, as well as for wells from the first set. For example, well data from the second well can be used with the syntactic models to estimate syntactic properties of the second well. The estimated syntactic properties, along with at least some of the well data from the second well can then be used by the pay zone predictor model to estimate properties, including pay zones, associated with the second well.

Example Computing Environment

Figure 1:
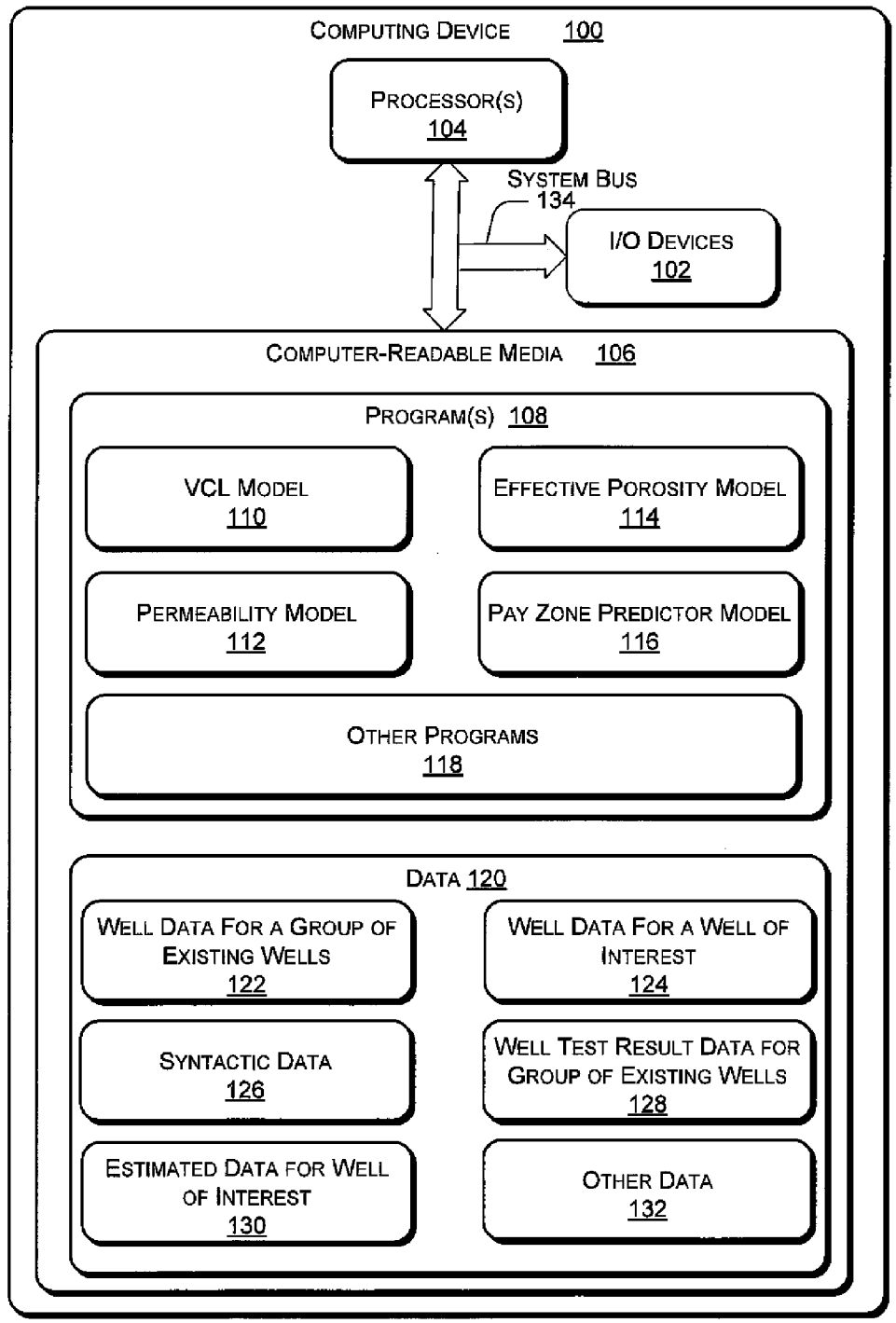
FIG. 1 illustrates an example computing device on which elements of pay zone prediction may be implemented.

FIG. 1 shows an example computing device 100 suitable for implementing embodiments of pay zone prediction. Computing device 100 can be implemented as any form of computing and/or electronic device. For example, computing device 100 can include a server, a desktop PC, a notebook or portable computer, a workstation, a mainframe computer, an Internet appliance and so on. Computing device 100 includes input/output (I/O) devices 102, one or more processor(s) 104, and computer readable media 106.

I/O devices 102 can include any device over which data and/or instructions can be transmitted or received by computing device 100. For example, I/O devices 102 can include one or more of an optical disk drive, a USB device, a keyboard, a touch screen, a monitor, a mouse, a digitizer, a scanner, a track ball, various cameras, motion detection devices, etc.

I/O devices 102 can also include one or more communication interface(s) implemented as any of one or more of a serial and/or parallel interface, a wireless interface, any type of network interface, a modem, a network interface card, or any other type of communication interface capable of connecting computing device 100 to a network or to another computing or electrical device.

Processor(s) 104 include microprocessors, controllers, and the like configured to process various computer executable instructions controlling the operation of computing device 100. For example, processor(s) 104 can enable computing device 100 to communicate with other electronic and computing devices, and to process instructions and data in conjunction with programs 108 stored in computer-readable media 106.

Computer-readable media 106, can include one or more memory components including random access memory (RAM), non-volatile memory (e.g., any of one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 106 provides storage mechanisms to store various information, data and/or instructions such as software applications and any other types of information and data related to operational aspects of computing device 100. For example, programs 108 stored on computer-readable media 106 can include a volume of clay material relative to total volume and/or shale volume (VCL) model 110, a permeability model 112, an effective porosity model 114, a zone predictor model 116, and other programs 118— such as an operating system and/or assorted application programs. Programs 108 can be executed on processor(s) 104.

Computer-readable media 106 can also include data 120. For example, as illustrated in FIG. 1, data 120 residing on computer-readable media 106 can include well data for a group of existing wells 122, well data for a well of interest 124, syntactic data 126, well test result data (including potentially water cut data) for the group of existing wells 128, estimated data from the well of interest 130 and other data 132 (including intermediate and final data created through use of one or more of programs 108).

Any of programs 108 and data 120 can reside wholly or partially on any of a variety of media types found in computer-readable media 106. For example portions of VCL model 110 can reside at different times in random access memory (RAM), read only memory (ROM), optical storage discs (such as CDs and DVDs), floppy disks, optical devices, flash devices, etc.

A system bus 134 can couple one or more of the processor(s) 104, 110 devices 102 and computer-readable media 106 to each other. System bus 134 can include one or more of any of several types of bus structures, including a memory bus or memory controller, a peripheral bus, an accelerated graphics port, and a processor or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, and a peripheral component interconnects (PCI) bus also known as a mezzanine bus, and so on.

Example Syntactic Models

Figure 2:
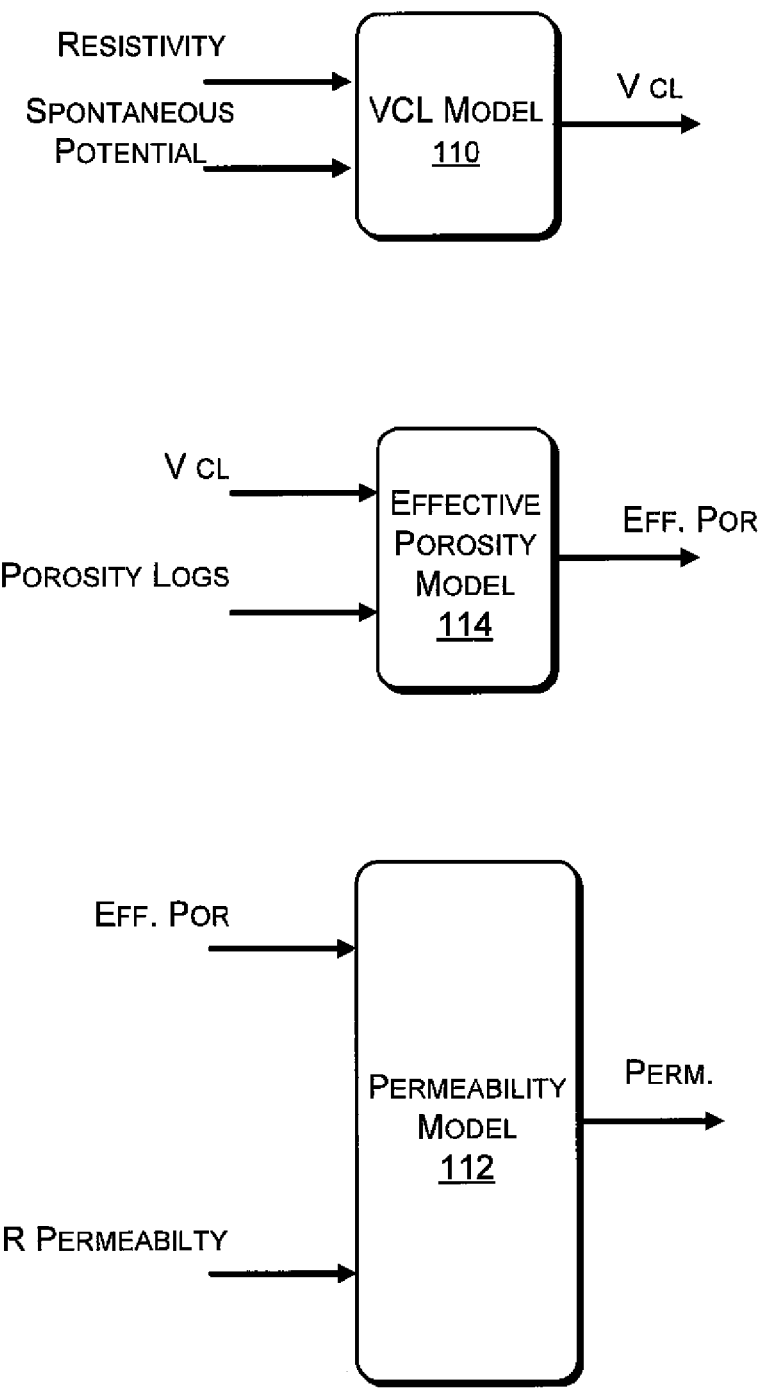
FIG. 2 illustrates examples of possible syntactic models in accordance with an embodiment of pay zone prediction.

FIG. 2 illustrates examples of possible syntactic models in accordance with an embodiment of pay zone prediction. The syntactic models include VCL model 110, effective porosity model 114 and permeability model 112.

In one possible implementation, syntactic models 110, 112, 114 are created by accessing well data from a group of existing wells. For example, the well data can come from a mature hydrocarbon field (i.e. a field having five or more existing wells). It will be understood however, that the concepts of pay zone prediction can also be used with groups of wells numbering less than five.

The term "well data", as used herein, includes any information associated with a well collected using any measurement technique known in the art, including both invasive and non invasive techniques. This can include data collected or derived at or near a well's location.

For example, well data can be collected through the use of well logs, drilling measurements, well tests, well core samples, seismic tests (including microseismic tests), swap tests, perforation interval information, measuring while drilling (MWD) tools, logging while drilling tools, etc. In one aspect, well data can be depth and/or layer dependent, such as layer specific data.

Well logs used to collect and produce well data can include, but are not limited to, resistivity logs (such as, for example, M2RX, M2R9, ILD and RT logs), porosity logs (such as MPHS, DPHI, PORZ and MPH1 logs), slowness or interval transit time logs, and logs measuring spontaneous potential.

Once collected and/or produced, the well data can be used to create various syntactic data, such as information regarding clay volume, effective porosity, permeability, etc. In one implementation, syntactic data can be interpreted from well data by one or more trained petro physics experts. It will be understood that the terms 'petro physicist' and 'petro physics expert' are used interchangeably herein and can include all personnel capable of interpreting well data to arrive at syntactic data.

For example, a petro physicist can examine various well log data from a well within the group of wells and estimate syntactic data such as volume of clay material relative to total volume and/or shale volume information (VCL) for the well. Similarly the petro physicist can examine well data and syntactic data to create effective porosity and/or permeability data as a function of depth and/or layer for a well. In one aspect, the petro physicist can rely on specialized petro physics software to perform such analyses.

Once syntactic data for all of the wells in the group of wells has been created, it can be used to build one or more syntactic models representative of the field, or a portion thereof (such as, for example a compartment, area, etc., of the field) with which the group of wells is associated. As illustrated in FIG. 2, these syntactic models can include VCL model 110, effective porosity model 114 and permeability model 112. It will be understood that other syntactic models can be used in addition to, or in the place of, syntactic models 110, 112, 114.

In one implementation, syntactic models 110, 112, 114 are trained using at least some of the syntactic data and well data from the wells in the group of wells. For example, well data from the wells can be correlated with syntactic data for the wells to arrive at VCL model 110, effective porosity model 114 and/or permeability model 112. It is noted that in one implementation, permeability model 112 can be created using VCL model 110 and effective porosity model 114. Similarly, effective porosity model 114 can be created using VCL model 110.

Syntactic models 110, 112, 114 can be built using any correlation methods known in the art capable of correlating input data (which may include well data and syntactic data) to corresponding output data, which can include synthetic data and actual measured well data. Correlation methods can include, among others, linear regression, neural network methods (including self organizing maps), and any statistical methods able to correlate well and syntactic data. Moreover it will be understood that syntactic models 110, 112, 114 can be trained using a wide variety of data series information, such as existing data arrays, including time, depth and/or layer dependent data.

For example, VCL model 110 can be created by correlating well data for a single well with associated syntactic data for the well created by a petro physicist. This can be done for each well in the group of wells to arrive at a VCL model 110 which describes a composite of the field in which the wells are found. In this way, once VCL model 110 is created, well data from a new well in the same field can be input to VCL model 110 and corresponding syntactic data can be output from the well approximating syntactic data for the new well which might be independently created by a petro physicist.

A similar process can be followed to train effective porosity model 114. For instance, well data and syntactic data (such as VCL data) for a well can be correlated to effective porosity data for the well as created by a petro physicist. This can be done for each well in the group of wells to arrive at an effective Porosity model 114 which describes a composite of the field in which the group of wells is found.

Moreover Permeability model 112 can be created by correlating well data (such as permeability data retrieved from nuclear magnetic resonance (NMR) tools) and syntactic data (such as effective porosity data) for a well to permeability data for the well as created by a petro physicist. This can be done for each well in the group of wells to arrive at a permeability model 112 which describes a composite of the field in which the group of wells is found.

It will be noted that even though FIG. 2 illustrates only three syntactic models 110, 112, 114, more or less syntactic models can be used with the concepts of pay zone prediction. Moreover, the inputs to syntactic models 110, 112, 114 illustrated in FIG. 2 are only one example of possible inputs. It will be understood that other types of inputs may be used in addition to, or in place of, the inputs shown.

Example Pay Zone Predictor Model

Figure 3:
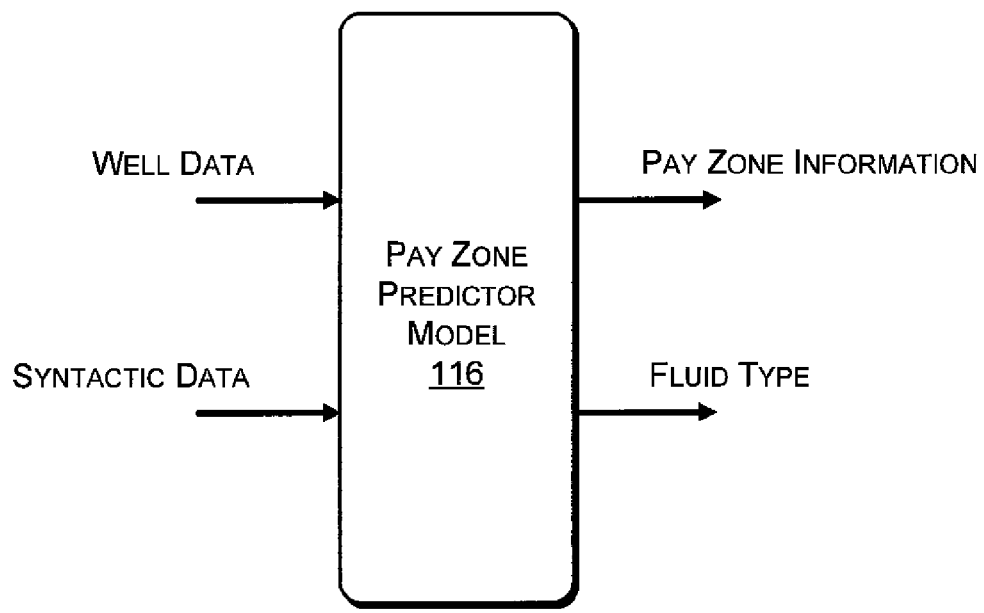
FIG. 3 illustrates an example pay zone predictor model in accordance with an embodiment of pay zone prediction.

FIG. 3 illustrates an example pay zone predictor model 116 in accordance with an embodiment of pay zone prediction. Pay zone predictor model 116 can be created by training it on a variety of well data and syntactic data. In one implementation, the well data includes perforation interval information (such as well test result data, including water cut information) for wells with which the well data and syntactic data are associated. Water cut information can be determined using swap tests, well tests or any other methods known in the art. In one embodiment, the syntactic data and well data are depth dependent.

Returning to the example group of wells discussed in conjunction with FIG. 2 above, in one possible implementation, pay zone predictor model 116 can be trained on well data and syntactic data from each well in the group of wells. Additionally, pay zone predictor model 116 can be trained on pay zone prediction information and fluid type prediction information for each well as supplied by, for example, a petro physicist. In one implementation, this can be done one well at a time.

For example, well data and syntactic data associated with a single well can be associated with pay zone data and/or fluid type data for the same well as created by a petro physicist. This can be done for each well in the group of wells such that pay zone predictor model 116 models a composite of the field in which the wells are found. In this way, once pay zone predictor model 116 is created, well data and syntactic data from a new well in the field can be input to pay zone predictor model 116 and corresponding pay zone data and/or fluid type data can be output from pay zone predictor model 116 approximating pay zone data and/or fluid type data for the new well which might be independently created by a petro physicist.

Pay zone predictor model 116 can be built using any correlation methods known in the art, including, among others, linear regression, neural network methods (including self organizing maps), clustering methods and any statistical methods able to correlate the well data, syntactic data and pay zone data and/or fluid type data. Moreover it will be understood that pay zone predictor model 116 can be trained using depth dependent data.

As noted above, pay zone predictor model 116 can be fed well data including well test result data. In one implementation, fluid content information from well test result data for each layer in a well along with perforation heights can be input to pay zone predictor model 116. This information can be supplied on an interval level (for example, water cut measured in an interval can provide an indication of a fluid type present at the interval). In one aspect, water cut of a layer can be assigned a constant value for each well log measurement within the interval.

A petro physicist's expert knowledge can be used to define clusters with target intervals which include reservoir rock. Such defined intervals or clusters can be used in pay zone predictor model 116 to predict pay zones.

Example Training Phase for the Pay Zone Predictor Model

In one possible embodiment, pay zone predictor model 116 can be fed with well data (including well test result data) for each interval and an indicator of a "good" or "bad" pay zone coming from expert knowledge, such as from a petro physicist. A "bad" pay zone can be indicated by an unfavorable water cut, which many operators may wish to avoid perforating when endeavoring to reclaim hydrocarbons from a well. Similarly, a "good" pay zone can be an interval in which hydrocarbons are present and from which there is no water production or a low water cut.

By identifying differences among similar combinations of well data, different types of rocks within a well can be distinguished. For example, different lithologies in a well can each have a typical combination of well data amplitudes, and clustering methods can be used to identify the individual lithologies. Clustering methods can include any clustering technology known in the art, including cob web, Ward's clustering, complete linking, single linking, k-means and manual clustering.

Information of "good" and "bad" pay zones can be used to isolate intervals to be perforated. Pay zone predictor model 116 can identify a corresponding cluster for each set of input data. This cluster can define a lithology and indicate a pay zone for a specific depth of the well, which can be presented to a user of pay zone predictor model 116.

Example Clustering Method

Figure 4:
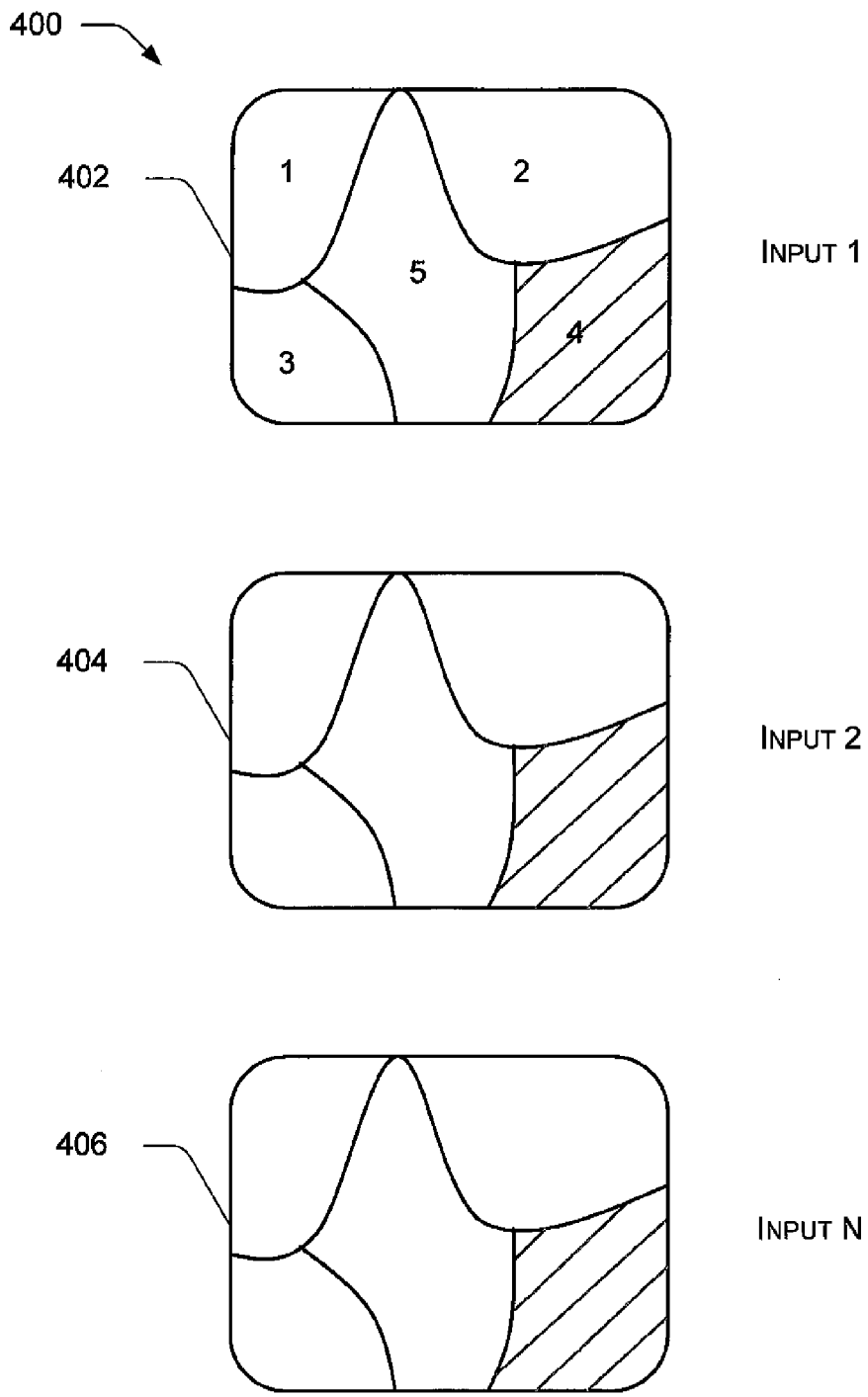
FIG. 4 illustrates an example clustering method in accordance with an embodiment of pay zone prediction.

FIG. 4 illustrates a self organizing map (SOM) model 400 with several different maps 402, 404, 406, which can be used with one implementation of pay zone prediction. Each map 402, 404, 406 includes different clusters, with cluster numbers 1-5 indicating clusters having a distinct lithology. For example, all data points found in the cluster designated by cluster number 1 come from the same lithology and share similarities. Similarly, all data points found in the cluster designated by number 2 share similarities, and so on.

Each map 402, 404, 406 represents one parameter input into the SOM (e.g. well log information, well test result information, well test information, and so on). All input data for a specific depth of a well are located in the same location in each map 402, 404, 406.

In the current example, cluster number 4 indicates a "good" pay zone. Therefore, all data within this cluster has been identified and labeled as a "good pay zone" by a petro physics expert. Moreover, each data point entered into model 400 represents one point in a depth of a well. As a result each data point in depth has one cluster number 1-5 assigned to it. In this example all depth intervals with cluster number 4 are those which the pay zone identification model recommends to be perforated.

Figure 5:
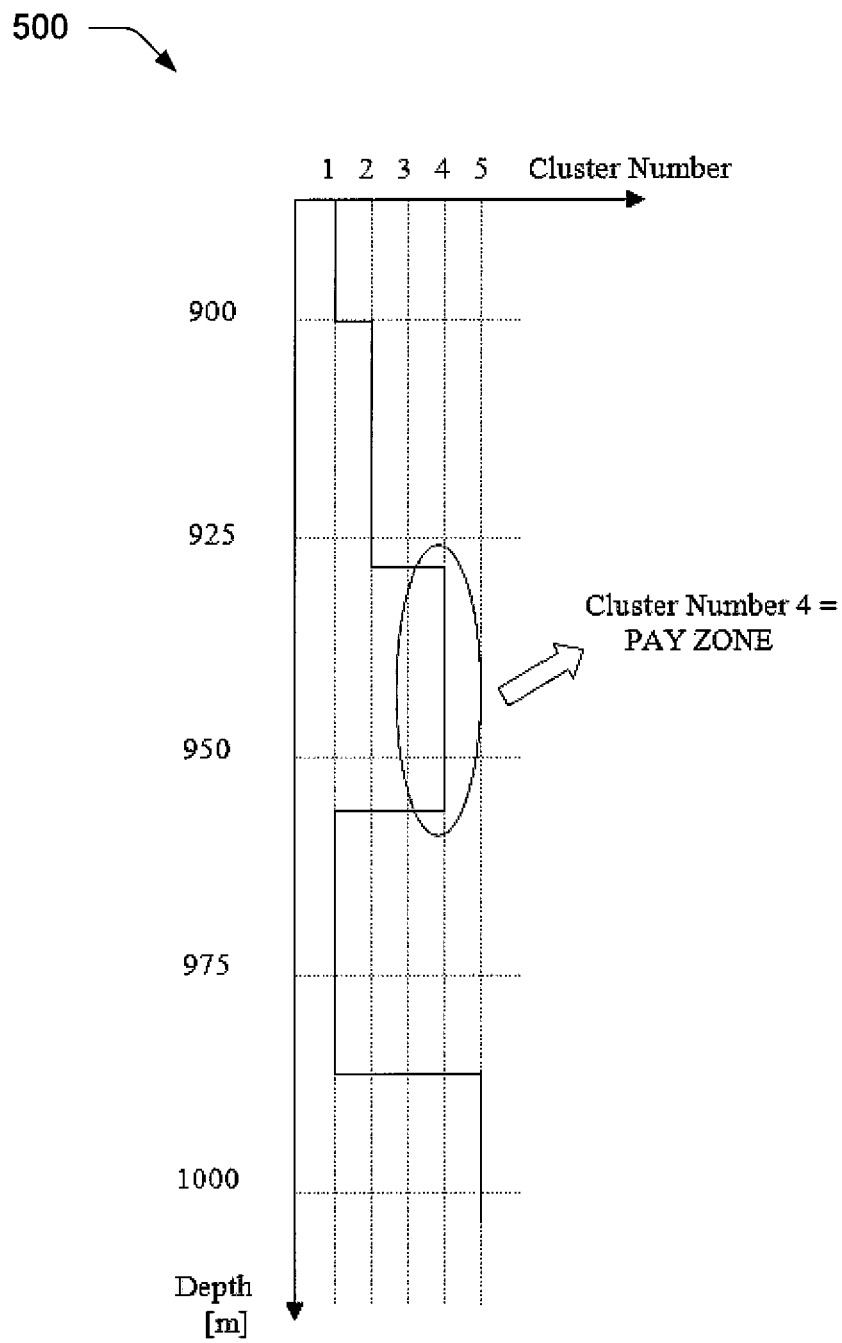
FIG. 5 illustrates a depth versus cluster number diagram in accordance with an embodiment of pay zone prediction.

FIG. 5 illustrates a depth versus cluster number diagram 500 which can be output by pay zone predictor model 116 and used to display the results of clustering models, such as model

400. As discussed above, in the instant example, cluster number 4 represents an identified "good pay zone" interval as indicated by a petro physicist. Therefore, the interval labeled as having cluster number 4 in FIG. 5 can be recommended by pay zone predictor model 116 as a good pay zone to be perforated. Correspondingly, it can be predicted that a well depth of approximately 950 meters—within the range of depth of cluster number 4—for example, can be perforated to access hydrocarbons while avoiding excessive water production.

It will be understood that the cluster number of a good pay zone may differ in different implementations in accordance with input from a petro physicist or a user. Moreover, a plurality of cluster numbers may be used to indicate desirable pay zones. For example, cluster number 4 may indicate a most preferred pay zone, while cluster number 1 may indicate a lesser preferred, but still desirable, pay zone. Alternately, several cluster numbers can indicate the same quality of pay zone. For example cluster numbers 3 and 2 could indicate equally poor pay zones.

It will also be understood that pay zone attractiveness may not necessarily increase with cluster number. For example, in FIG. 5 cluster number 5 may be seen as being a bad pay zone, even though cluster number 5 is numerically greater than cluster number 4, which itself could indicate a good pay zone.

Example Cascade of Models

Figure 6:
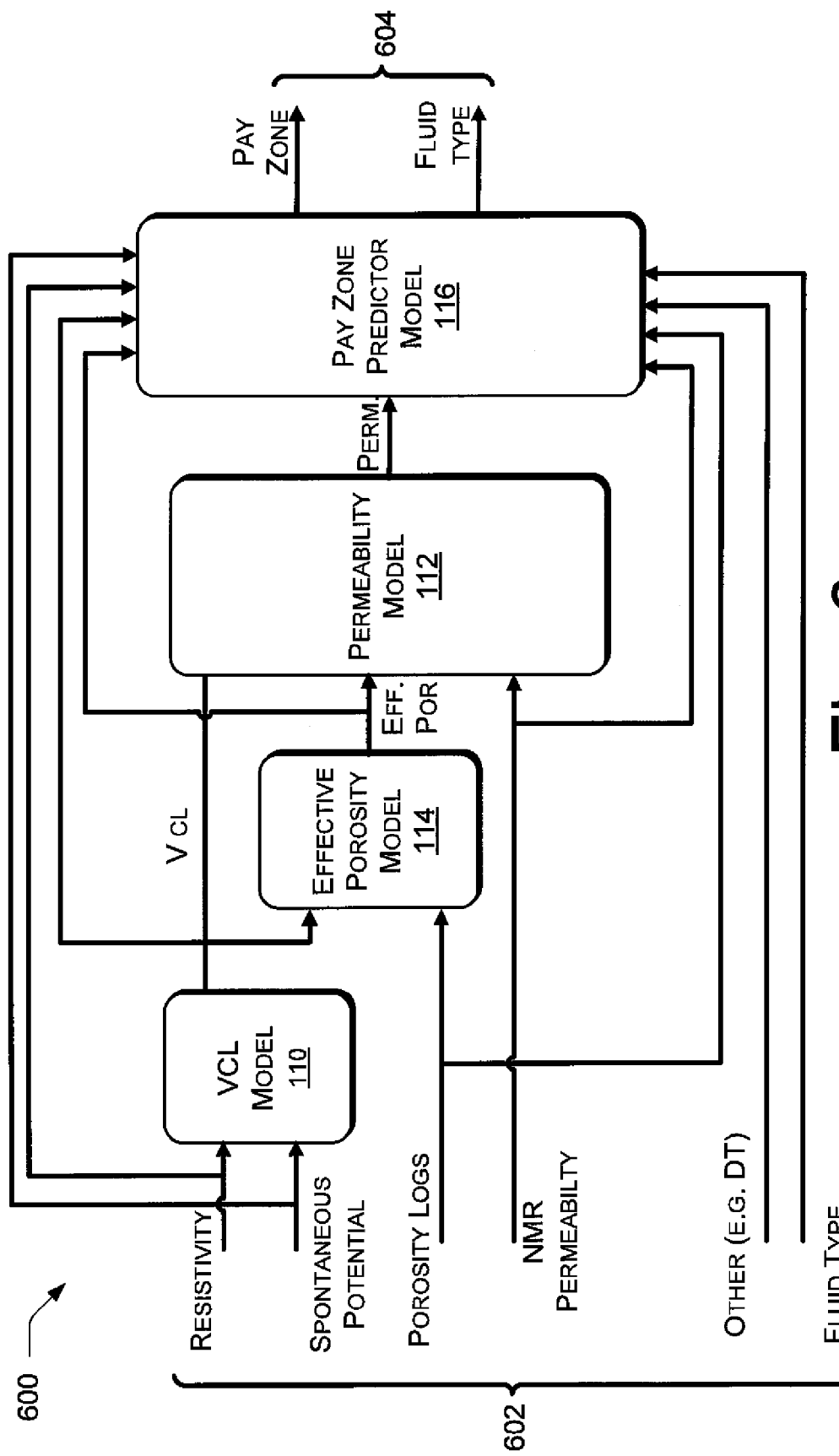
FIG. 6 illustrates a cascade of syntactic models used to create a pay zone predictor model in accordance with an embodiment of pay zone prediction.

FIG. 6 illustrates an example cascade of models 600 on which embodiments of pay zone prediction can be practiced. Cascade of models 600 includes VCL model 110, effective porosity model 114 and permeability model 112, coupled such that their outputs can be used to create inputs to pay zone predictor model 116.

In one implementation, cascade of models 600 can be used to build pay zone predictor model 116. For example, once syntactic models 110, 112, 114 have been created, they can be used along with assorted well data, such as fluid type data, perforation interval data, etc., to train pay zone predictor model 116.

For instance, pay zone predictor model 116 can be setup on VCL information from VCL model 110, effective porosity information from effective porosity model 114, permeability information from permeability model 112, and various well data associated with wells in a group of wells. In one possible embodiment, well data for a well in the group of wells can be entered into inputs 602 in cascade of models 600. In one aspect the well data can be depth dependent.

For example, well data for a given depth or layer of the well can be input into inputs 602, and various syntactic data for the depth or layer of the well can be calculated from syntactic models 110, 112, 114 and input to pay zone predictor model 116. All of this information can be correlated with pay zone and/or fluid type information for the corresponding depth or layer, and clustering can be performed within pay zone predictor model 116.

Such a process can be iterated for a number of different depths and/or layers in the well, with the number of iterations being dependent on a variety of factors, including the availability of well data. For example, in one possible implementation, each depth of available data can represent an iteration, with the accuracy of pay zone predictor model 116 increasing with an increased number of depths. For example, accuracy of pay zone predictor model 116 may be increased if well data corresponding to every 6 inches in a well is used, rather than if well data corresponding to only every 1 foot of the well is used.

This process can be repeated for a number of wells in the group of wells, such that pay zone predictor model 116 becomes trained up on the field in which the group of wells is found. Up to a point, the more wells from a field that are used to train up pay zone predictor model 116, the better pay zone predictor model 116 may be able to approximate pay zone and/or fluid type data at various locations and depths of the field. Beyond this point (sometimes called the critical point) however, additional wells may not add noticeable value in training up pay zone predictor model 116, or they may even result in deleteriously overtraining of pay zone predictor model 116.

Once pay zone predictor model 116 has been built, it can be used to predict pay zones and/or fluid type information for new wells in the field on which syntactic models 110, 112, 114 and pay zone predictor model 116 have been trained. For example, well data associated with the new well can be input to inputs 602. This well data can be used by syntactic models 110, 112, 114 to produce syntactic data to be input to pay zone predictor model 116 along with the well data. In one implementation this well data does not include well test result data or perforation interval data from the new well, as this new well may not have been perforated or tested yet.

Moreover, pay zone predictor model 116 can be used in other locations with similar geology to the field on which syntactic models 110, 112, 114 and pay zone predictor model 116 have been trained.

Pay zone predictor model 116 can accept the input well data and syntactic data for the new well and produce pay zone and/or fluid type information. In one implementation, the well data for the new well is depth dependent, such that well data for a given depth is entered into inputs 602, and pay zone information and/or fluid type information for that depth is output from pay zone predictor model 116 at outputs 604.

Several successive iterations of depth or layer specific well data can be input to inputs 602, resulting in the production of corresponding depth or layer specific pay zone and/or fluid type output data 604 by pay zone predictor model 116. In this manner, a depth versus cluster number diagram similar to depth versus cluster number diagram 500 shown in FIG. 5 can be created for the new well. In one implementation, the depth versus cluster number diagram is created by pay zone predictor model 116 and presented to a user along with a key describing which cluster number(s) are attractive for perforation. In one aspect the key can describe what can be predicted at each cluster number (i.e. water, hydrocarbons, a combination thereof, or no fluid).

EXAMPLE METHODS

Figure 7:
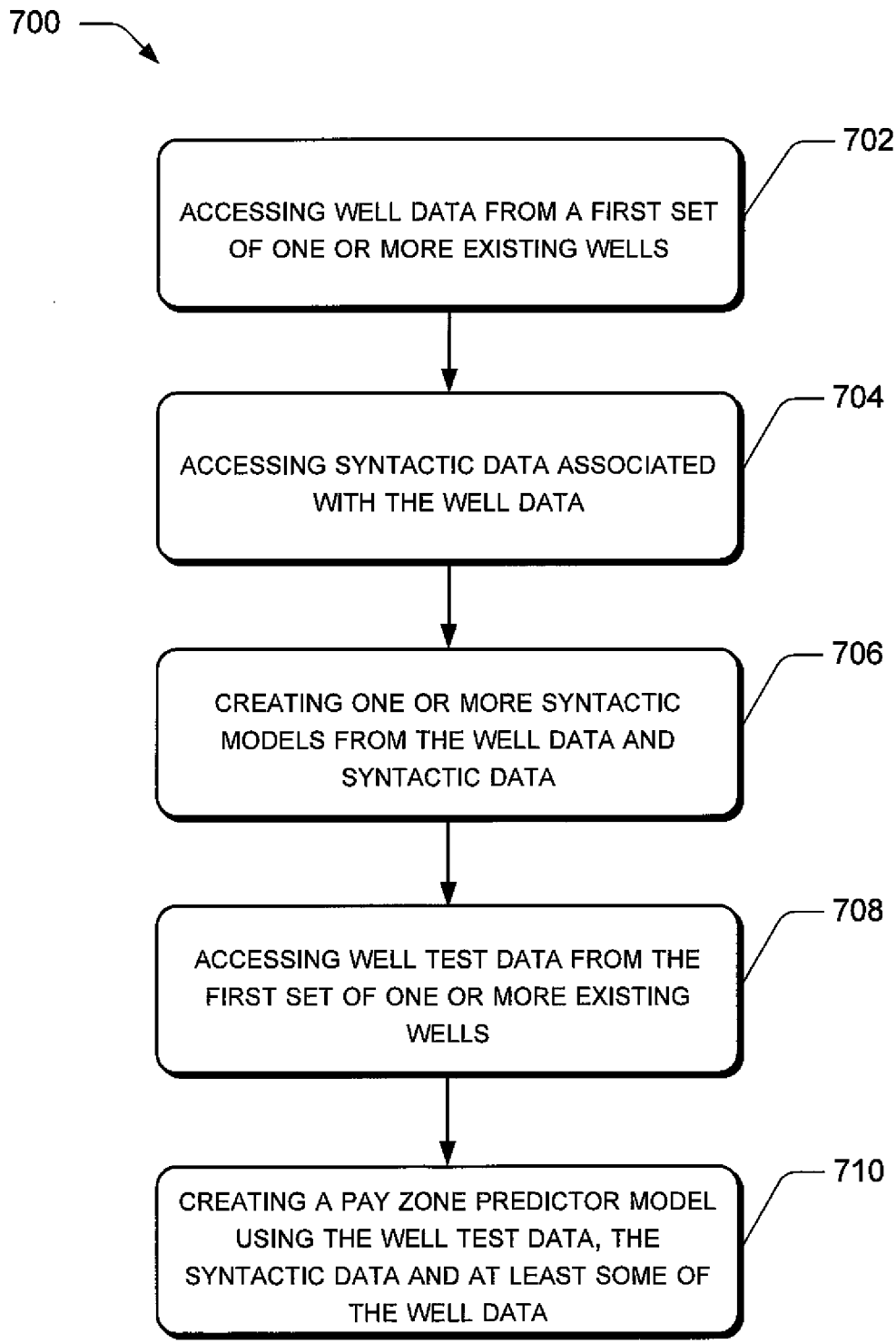
FIG. 7 illustrates example method(s) for pay zone prediction.
Figure 8:
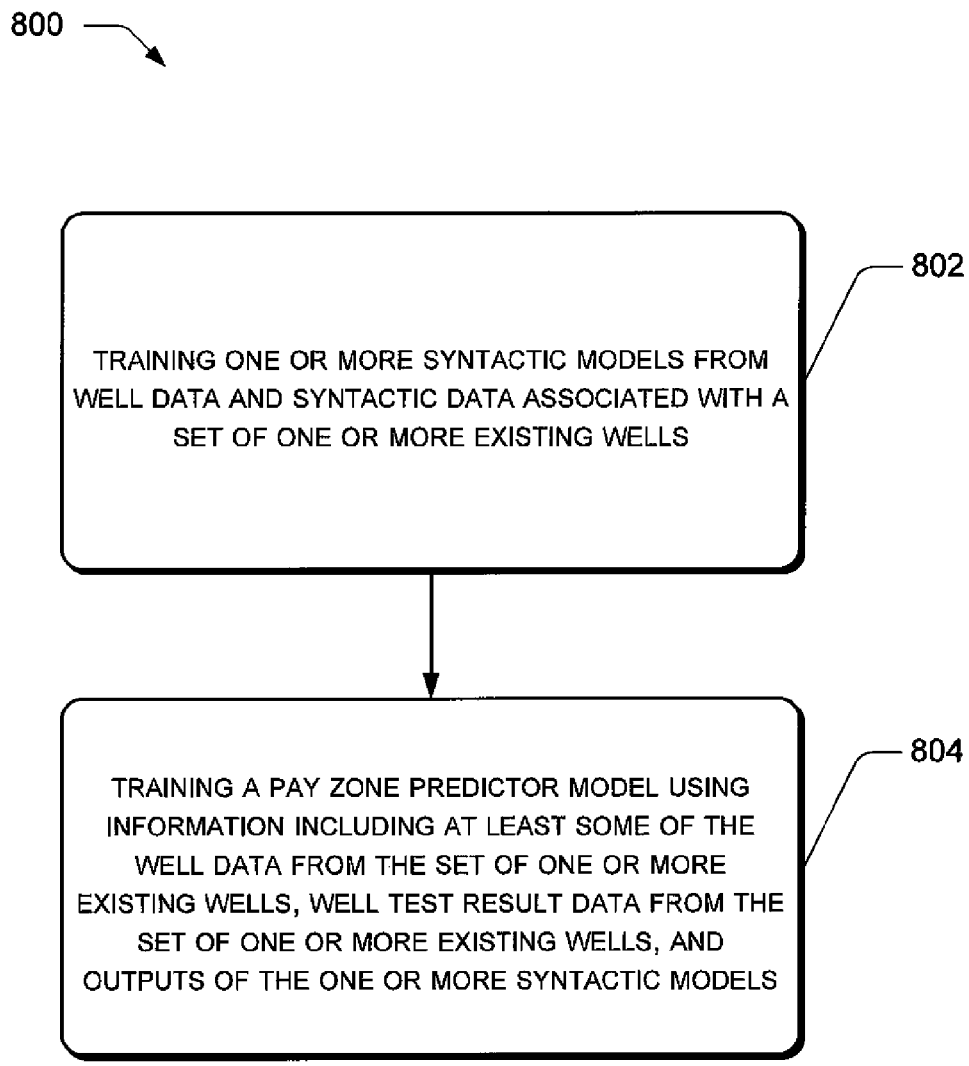
FIG. 8 illustrates example method(s) for pay zone prediction.
Figure 9:
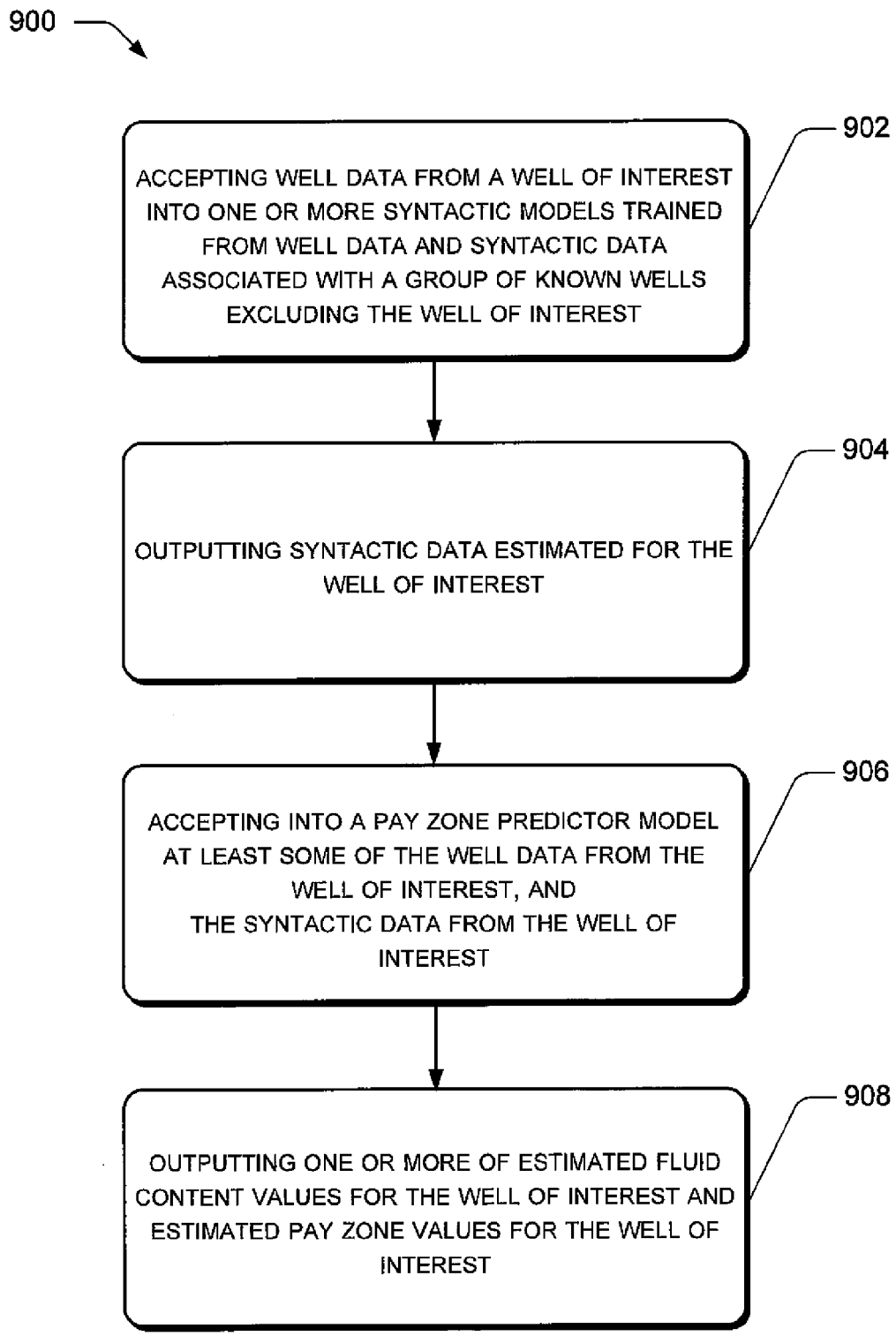
FIG. 9 illustrates example method(s) for pay zone prediction.

FIGS. 7-9 illustrate example methods for implementing aspects of pay zone prediction. The methods are illustrated as a collection of blocks in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may be described with reference to elements shown in FIGS. 1-6. Additionally, nothing regarding the order of presentation of the methods below should be used to construe importance of one method over another.

Example Method I

FIG. 7 illustrates an example method 700 for creating a pay zone predictor, such as pay zone predictor 116. At block 702, well data from a first set of one or more existing wells is accessed. In one implementation, all the wells in the first set of wells are located in the same hydrocarbon field.

The well data can include any information associated with a well collected using any measurement technique known in the art and can be collected through the use of well logs, drilling measurements, well tests, well core samples, seismic tests (including micros eismic tests), swap tests, perforation interval information, measuring while drilling (MWD) tools, etc. In one aspect, the well data can be depth and/or layer dependent.

At block 704, syntactic data associated with the well data is accessed. In one implementation, the syntactic data is interpreted/created from well data by one or more trained petro physics experts. For example, a petro physicist can examine various well log data from a well within the first set of wells and estimate syntactic data such as volume of clay material relative to total volume and/or shale volume information (VCL) for the well. Similarly the petro physicist can examine well data and syntactic data to create effective porosity and/or permeability data as a function of depth for a well. In one aspect, the petro physicist can rely on specialized petro physics software to perform such analyses.

At block 706, one or more syntactic models are created from the well data and syntactic data. The syntactic models can include any model which might be helpful to a petro physicist or a user examining a well. For example, the syntactic models can include a volume of clay material relative to total volume and/or shale volume information (VCL) model, such as VCL model 110, a porosity model, such as effective porosity model 114, and a permeability model, such as permeability model 112. Moreover, the syntactic models can be built using any correlation methods known in the art suitable to correlate input data (which may include well data and syntactic data) to corresponding output synthetic syntactic data and/or well data. Correlation methods can include, among others, linear regression, neural network methods (including self organizing maps), and any statistical methods able to correlate well and syntactic data.

Each syntactic model can be created by correlating well data (and perhaps also syntactic data) for a single well with other associated syntactic data for the well created by a petro physicist. The syntactic models can be created using depth and/or layer dependent data by, for example, using well data and syntactic data corresponding to varying depths or layers in the well.

Such training of the syntactic models can be done using well data and syntactic data for each well in the first set of one or more existing wells to arrive at syntactic models which describe a composite of the field in which the wells of the first set of one or more existing wells are found. In this way, once the syntactic models are created, well data from a new well in the same field can be input to the syntactic models, which can output corresponding synthetic syntactic data approximating syntactic data for the new well which might be independently created by a petro physicist.

At block 708, well test result data from one or more wells in the first set of one or more existing wells can be accessed. Well test result data can include any kind of data enabling a petro physicist to determine type and/or quantity of fluid present at a given location in a well, such as water cut data. For example, water cut data can be found using swap tests after a well is perforated, or any other suitable test known in the art.

At block 710 a pay zone predictor model, like pay zone predictor model 116 for example, is created using the syntactic data and at least some of the well data. In one implementation, the well data includes water cut information.

The pay zone predictor model can be trained on well data and syntactic data from each well in the first set of one or more existing wells. Additionally, the pay zone predictor model can be trained on pay zone prediction information and fluid type prediction information for each well as supplied by, for example, a petro physicist. In one implementation, this can be done one well at a time. In another possible implementation multiple wells can be applied at once. In still another possible implementation, the pay zone predictor model can be trained on composite information for the first set of one or more existing wells.

For example, well data and syntactic data associated with a single well can be associated with pay zone data and/or fluid type data for the same well as created by a petro physicist. This can be done for each well in the first set of one or more existing wells such that pay zone predictor model models a composite of the field in which the wells are found. In this way, once the pay zone predictor model is created, well data and syntactic data from a new well in the field can be input to the pay zone predictor model and corresponding pay zone data and/or fluid type data can be output from the pay zone predictor model approximating pay zone data and/or fluid type data which might be independently created by a petro physicist for the new well.

The pay zone predictor model can be built using any correlation methods known in the art, including, among others, linear regression, neural network methods (including self organizing maps), and any statistical methods able to correlate the well data, syntactic data and pay zone data and/or fluid type data. Moreover it will be understood that the pay zone predictor model can be trained using depth dependent and/or layer dependent data.

In one implementation, results of water cut for each layer in a well along with perforation heights can be input to the pay zone predictor model. This information can be supplied on an interval level (water cut measured in an interval can provide an indication of a fluid type present at the interval). In one aspect, water cut of a layer can be assigned as a constant value for each well log measurement within the interval.

A petro physicist's expert knowledge can be used to define target intervals which include reservoir rock associated with good hydrocarbon production. Such defined intervals can be used in the pay zone predictor model to predict pay zones.

In one possible embodiment, the pay zone predictor model can be fed for each interval with well data (including water cut data) and an indicator of a "good" or "bad" pay zone coming from expert knowledge, such as from a petro physicist. A "bad" pay zone can be indicated by a very high water cut, which many operators may wish to avoid perforating when endeavoring to reclaim hydrocarbons from a well. A "good" pay zone can be an interval with a high potential for hydrocarbon reclamation and a low potential for water production.

By identifying differences among similar combinations of well data, different types of rocks within a well can be distinguished. For example, different lithologies in a well can each have a typical combination of well data amplitudes, and clustering methods can be used to identify the individual lithologies. Clustering methods can include any clustering technology known in the art, including cob web, Ward's clustering, complete linking, single linking, k-means and manual clustering.

Information of "good" and "bad" pay zones can be used to isolate intervals to be perforated. The pay zone predictor model can identify a corresponding cluster for each set of input data. This cluster can define a lithology and pay zone indicator for a specific depth of the well, which can be presented to a user of the pay zone predictor model.

Example Method II

FIG. 8 illustrates an example process 800 for training syntactic models, such as syntactic models 110, 112, 114, and a pay zone predictor model, such as pay zone predictor model 116.

At block 802 one or more syntactic models are trained from well data and syntactic data associated with a set of one or more existing wells. The one or more syntactic models include any models which can product syntactic information that might be helpful to a petro physicist or a user examining a well.

In one implementation, the one or more syntactic models can include a volume of clay material relative to total volume and/or shale volume information (VCL) model, such as VCL model 110, a porosity model, such as effective porosity model 114, and a permeability model, such as permeability model 112. Moreover, the one or more syntactic models can be built using any correlation methods known in the art capable of correlating input data (which may include well data and syntactic data) to corresponding output syntactic data. Correlation methods can include, among others, linear regression, neural network methods (including self organizing maps), and any statistical methods able to correlate well and syntactic data.

In one implementation the syntactic data is created by a petro physicist. Moreover, the syntactic models can be created using depth and/or layer dependent data by, for example, using well data and syntactic data corresponding to varying depths or layers in a well.

For example, training of the syntactic models can be done using any of the techniques described above, including the techniques described in the discussion of FIG. 7.

At block 804, the pay zone predictor model is trained using information including at least some of the well data from the set of one or more existing wells, well test result data (such as, for example, water cut data) from the set of one or more existing wells, and outputs of the one or more syntactic models. Well test result data includes any data which might enable a petro physicist to determine type and/or quantity of fluid present at a given location in a well found using any suitable technique known in the art.

In one implementation, the one or more syntactic models can be cascaded, such as in cascade of models 600. For instance, the pay zone predictor model can be trained on VCL information from a VCL model, effective porosity information from an effective porosity model, and permeability information from a permeability model. The pay zone predictor model can also be trained using various well data associated with wells in the group of wells. In one aspect the well data can be depth and/or layer dependent.

For instance, well data for a given depth or layer of a well can be input into the one or more syntactic models, and various synthetic syntactic data for the depth or layer of the well can be calculated from the one or more synthetic models. This synthetic data along with corresponding well data can be input to the pay zone predictor model. All of this information can then be correlated with pay zone and/or fluid type information for the corresponding depth or layer, and clustering can be performed within the pay zone predictor model.

Such a process can be iterated for each different depth and/or layer measured in the well, with the number of iterations being dependent on a variety of factors, including the availability of well data. In one implementation, the accuracy of pay zone predictor model can be increased with an increased number of depth dependant iterations.

This process can be repeated for a number of wells in the one or more existing wells, such that the pay zone predictor mode becomes trained up on the field in which the one or more existing wells are found. As with depths above, the more wells from a field that are used to train up the pay zone predictor model, the better the pay zone predictor model may be able to approximate pay zone and/or fluid type data at various locations and depths of the field.

Once the pay zone predictor model has been built, it can be used to predict pay zones and/or fluid type information for new wells in the field on which the one or more syntactic models and the pay zone predictor model have been trained. For example, well data associated with the new well can be input into the one or more syntactic models and used to produce syntactic data that can be input to the pay zone predictor model along with the well data. In one implementation this well data does not include water cut or perforation interval data from the new well, as this new well may not have been perforated yet.

Moreover, the pay zone predictor model can be used in other locations with similar geology to the field on which the one or more syntactic models and the pay zone predictor model have been trained.

The pay zone predictor model can accept the input well data and syntactic data for the new well and produce pay zone and/or fluid type information. In one implementation, the well data for the new well is depth dependent, such that well data for a given depth is entered into the pay zone predictor model and pay zone information and/or fluid type information for that depth is output from the pay zone predictor model.

Example Method III

FIG. 9 illustrates an example process 900 for accepting well data from a well of interest and outputting estimates of water cut and/or pay zone information from the well in accordance with one embodiment of pay zone prediction.

At block 902, well data from the well of interest is accepted into one or more syntactic models (such as syntactic models 110, 112, 114) trained from well data and syntactic data associated with a group of known wells excluding the well of interest. In one implementation, the well of interest and the group of known wells lie in the same (or similar) hydrocarbon field. In one implementation the well data for the well of interest does not include water cut or perforation interval data from the well of interest, as the well of interest may not have been perforated yet.

At block 904 syntactic data estimated for the well of interest is output from the syntactic models. In one implementation, the output syntactic data is an estimate based on syntactic data from other wells in the group of known wells.

At block 906, at least some of the well data and the syntactic data from the well of interest are accepted into the pay zone predictor model. In one implementation the well data and the syntactic data are depth or layer dependent.

At block 908, estimated fluid content values, such as water cut values, for the well of interest and/or estimated pay zone values for the well of interest are output.

For example, if the well data for the well of interest is depth dependent, then depth dependant pay zone information and/or fluid type information can be output. Several successive iterations of depth or layer specific well data can be input to the pay zone predictor model, resulting in the production of corresponding depth or layer specific pay zone and/or fluid type output data by the pay zone predictor model. In this manner, a depth versus cluster number diagram similar to cluster number diagram 500 can be created for the well of interest. In one implementation, the depth versus cluster number diagram is created by the pay zone predictor model and presented to a user along with a key describing which cluster number(s) are attractive for perforation. In one aspect the key can describe what can be predicted at each cluster number (i.e. water, hydrocarbons, a combination thereof, or no fluid at all).

Conclusion

Although embodiments of pay zone prediction have been described in language specific to structural features and/or methods, it is to be understood that the subject of the appended claims is not necessarily limited to the specific features or methods described. Rather, the specific features and methods are disclosed as exemplary implementations of pay zone prediction.

What is claimed is:

1. A method comprising, using at least one processor:
   accessing well data, including well test data, from a first set of one or more existing wells;
   accessing syntactic data associated with the well data, wherein the syntactic data includes volume of clay material data, total volume data, shale volume data, porosity data or permeability data;
   training one or more syntactic models from the well data and syntactic data, wherein the one or more syntactic models includes a volume of clay material relative to total volume (VCL) model, an effective porosity model or a permeability model;
   training a pay zone predictor model using the well test data, the syntactic data, and at least some of the well data, wherein the pay zone predictor model is configured to predict at least one pay zone in at least one well, and wherein the well test data used to create the pay zone predictor model includes water cut data.

2. The method of claim 1, wherein the accessing well data includes accessing one or more of:
   well log data;
   drilling measurement data;
   well test data;
   well core data;
   seismic data;
   microseismic data;
   data obtained from measuring while drilling or logging while drilling tools.

3. The method of claim 1, wherein the accessing syntactic data includes:
   accessing estimates of a volume of clay material relative to total volume as a function of well depth based on the well data; and
   accessing estimates of an effective permeability as a function of well depth based on the well data.

4. The method of claim 1, wherein the accessing syntactic data includes:
   accessing estimates of a volume of clay material relative to total volume as a function of well depth based on the well data;
   accessing estimates of an effective porosity as a function of well depth based on the well data.

5. The method of claim 1, wherein the creating one or more syntactic models includes creating a model of a volume of day material relative to total volume (VCL) as a function of depth, and creating one or more of:
   an effective porosity model as a function of well depth;
   a permeability model as a function of well depth.

6. The method of claim 1, wherein the creating one or more syntactic models includes correlating the well data to syntactic data using correlation methods.

7. The method of claim wherein the creating a pay zone predictor model further includes training the pay zone predictor model on the syntactic models, the well test data and the at least some of the well data using one or more of:
   correlation methods;
   clustering methods.

8. The method of claim 1, wherein the creating a pay zone predictor model includes creating a model configured to accept inputs of syntactic information and well data from a second well outside of the first set of one or more existing wells and return approximations of one or more of:
   water cut values for the second well;
   pay zone values for the second well.

9. The method of claim 1, further including:
   accessing well data from a second well outside of the first set of one or more existing wells;
   recalling from the well data from the second well and the one or more syntactic models, first properties of the second well as a function of well depth, the first properties including volume of clay material relative to total volume (VCL) properties and one or more of:
   effective porosity properties;
   permeability properties;
   inputting the first properties and at least some of the well data from the second well to the pay zone predictor model,
   utilizing the pay zone predictor model to examine the first properties and at least some of the well data from the second well and estimate second properties associated with the second well including one or more of:
   cluster number information;
   fluid content information.

10. A non-transitory computer-readable medium having a set of computer-readable instructions residing thereon that, when executed, perform acts comprising:
   training one or more syntactic models from well data and syntactic data associated with a set of one or more existing wells, wherein the one or more syntactic models includes a volume of clay material relative to total volume (VCL) model, an effective porosity model or a permeability model, and wherein the syntactic data includes volume of clay material data, total volume data, shale volume data, porosity data or permeability data;
   training a pay zone predictor model, configured to predict at least one pay zone in at least one well, using information including:
   at least some of the well data from the set of one or more existing wells;
   well test result data from the set of one or more existing wells; and
   outputs of the one or more syntactic models.

11. The computer-readable medium of claim 10 having a set of computer-readable instructions that, when executed, perform acts further comprising:
receiving well data from a well of interest outside of the set of one or more existing wells;
utilizing the syntactic models and the pay zone predictor model to extrapolate from the well data from the well of interest one or more of the following:
an estimate of water cut information for the well of interest;
an estimate of cluster information for the well of interest.

12. The computer-readable medium of claim 10 having a set of computer-readable instructions that, when executed, perform acts further comprising training one or more of the syntactic models using neural network methods.

13. The computer-readable medium of claim 10 having a set of computer-readable instructions that, when executed, perform acts further comprising training the pay zone predictor model using one or more of:
correlation methods;
clustering methods.

14. The computer-readable medium of claim 10 having a set of computer-readable instructions that, when executed, perform acts further comprising accepting an input of well data from a from a well of interest outside of the set of one or more existing wells and outputting an estimate of where pay zones might be found at various depths within the well of interest.

15. The computer-readable medium of claim 10 having a set of computer-readable instructions that, when executed, perform acts further comprising training the one or more syntactic models using self-organizing map techniques.

16. The computer-readable medium of claim 10 having a set of computer-readable instructions that, when executed, perform acts further comprising training one or more syntactic models from well data and syntactic data associated with a set of one or more existing wells to create a model of a volume of clay material relative to total volume (VCL) as a function of well depth.

17. The computer-readable medium of claim 10 having a set of computer-readable instructions that, when executed, perform acts further comprising training one or more syntactic models from well data and syntactic data associated with a set of one or more existing wells to create one or more of:
an effective porosity model as a function of well depth;
a permeability model as a function of well depth.

18. A non-transitory computer-readable medium having a set of computer-readable instructions residing thereon that, when executed, perform acts comprising:
accepting well data from a well of interest into one or more syntactic models trained from well data and syntactic data associated with a group of known wells excluding the well of interest, wherein the one or more syntactic models includes a volume of clay material relative to total volume (VCL) model, an effective porosity model or a permeability model, and wherein the syntactic data includes volume of clay material data, total volume data, shale volume data, porosity data or permeability data;
outputting syntactic data estimated for the well of interest from the one or more syntactic models;
accepting, into a pay zone predictor model configured to predict at least one pay zone in at least one well:
at least some of the well data from the well of interest; and
the syntactic data estimated for the well of interest and output from the one or more syntactic models, and
outputting from the pay zone predictor model one or more of:
estimated fluid content values for the well of interest;
estimated pay zone values for the well of interest.

19. The computer-readable medium of claim 18 having a set of computer-readable instructions that, when executed, perform acts further comprising outputting an estimate of a volume of clay material relative to total volume (VCL) as a function of well depth of the well, of interest.

20. The computer-readable medium of claim 18 having a set of computer-readable instructions that, when executed, perform acts further comprising outputting estimated pay zone values through use of clustering techniques.

* * * * *